(12) United States Patent
Yee et al.

(10) Patent No.: US 12,311,964 B2
(45) Date of Patent: May 27, 2025

(54) QUESTIONNAIRE APPARATUS, QUESTIONNAIRE METHOD, AND NON-TRANSITORY COMPUTER-READABLE STORAGE MEDIUM

(71) Applicant: TOYOTA JIDOSHA KABUSHIKI KAISHA, Toyota Aichi-ken (JP)

(72) Inventors: Sokfan Yee, Toyota (JP); Hiromitsu Kobayashi, Nisshin (JP); Takashi Tokuyama, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 17/979,154

(22) Filed: Nov. 2, 2022

(65) Prior Publication Data

US 2023/0134362 A1 May 4, 2023

(30) Foreign Application Priority Data

Nov. 4, 2021 (JP) ................. 2021-180579

(51) Int. Cl.
*B60W 50/08* (2020.01)
*B60W 40/02* (2006.01)
*B60W 60/00* (2020.01)

(52) U.S. Cl.
CPC ............ *B60W 50/08* (2013.01); *B60W 40/02* (2013.01); *B60W 60/00* (2020.02)

(58) Field of Classification Search
CPC ...... B60W 50/08; B60W 40/02; B60W 60/00; B60W 2556/10; B60W 40/09;
(Continued)

(56) References Cited

U.S. PATENT DOCUMENTS 10,866,106 B2 12/2020 Arakawa
10,991,176 B2 4/2021 Yoshizaki et al.
(Continued)

FOREIGN PATENT DOCUMENTS

JP 2020-52468 A 12/2016
JP 2020052468 A 4/2020
(Continued)

*Primary Examiner* — Nga X Nguyen
(74) *Attorney, Agent, or Firm* — Dinsmore & Shohl LLP (57) ABSTRACT

The present disclosure relates to an evaluation apparatus which evaluates autonomous driving performed by the autonomous driving vehicle. The present disclosure provides a technique which enables carrying out a questionnaire composed of one or more appropriate questions while reducing the number of the questions. The questionnaire apparatus includes a question management unit configured to manage one or more questions prepared for a passenger of an autonomous driving vehicle to evaluate autonomous driving, an information acquisition unit configured to acquire driving environment information and driving state information related to the autonomous driving, and a question determination unit configured to determine one or more request questions for requesting an answer from the passenger from among one or more managed questions based on at least one of the driving environment information and the driving state information.

7 Claims, 5 Drawing Sheets

(58) Field of Classification Search
CPC ..... B60W 60/00253; B60W 30/18163; B60W 60/0015; B60W 10/18; B60W 2710/18; B60W 2050/0075; B60W 30/14; B60W 30/16; B60W 40/08; B60W 50/082; B60W 2050/0064; B60W 2540/30; B60W 2552/30; B60W 2710/20; B60W 2555/60; B60W 40/04; B60W 2556/50; B60W 2050/0031; B60W 2050/0062; B60W 2050/0095; B60W 30/12; B60W 30/095; G05D 1/0088; G06F 16/235; G06F 16/29; G06F 16/9537; G06Q 20/0855; G07C 5/008; G08G 1/096725; G08G 1/16; H04L 67/12; H04L 67/125
See application file for complete search history.

(56) References Cited

U.S. PATENT DOCUMENTS

| | | | |
|---|---|---|---|
| 10,991,254 | B2 | 4/2021 | Hayashi et al. |
| 11,048,263 | B2 | 6/2021 | Urano |
| 11,052,780 | B2 | 7/2021 | Taguchi et al. |
| 11,281,215 | B2 | 3/2022 | Yoshizaki et al. |
| 2008/0291032 | A1* | 11/2008 | Prokhorov ......... B64D 11/0015 340/576 |
| 2019/0128694 | A1 | 5/2019 | Matsushita et al. |
| 2019/0129438 | A1 | 5/2019 | Morita et al. |
| 2020/0094845 | A1* | 3/2020 | Shiga ................... B60W 40/09 |
| 2020/0189610 | A1 | 6/2020 | Sakai et al. |
| 2020/0292322 | A1* | 9/2020 | Ozog .................... G06F 16/235 |
| 2020/0324788 | A1 | 10/2020 | Ando |
| 2022/0114511 | A1 | 4/2022 | Ebata et al. |
| 2023/0368302 | A1* | 11/2023 | Iqbal .................... B60W 40/09 |

FOREIGN PATENT DOCUMENTS

| | | | |
|---|---|---|---|
| JP | 2020524632 A | | 8/2020 |
| JP | 2020160605 A | | 10/2020 |
| KR | 20220089772 A | * | 12/2020 |
| WO | 2018232237 A1 | | 12/2018 |

* cited by examiner

QUESTIONNAIRE APPARATUS, QUESTIONNAIRE METHOD, AND NON-TRANSITORY COMPUTER-READABLE STORAGE MEDIUM

CROSS-REFERENCE TO RELATED APPLICATION

The present application claims priority under 35 U.S.C. § 119 to Japanese Patent Application No. 2021-180579, filed Nov. 4, 2021, the contents of which application are incorporated herein by reference in their entirety.

BACKGROUND

Field

The present disclosure relates to a technique for evaluating autonomous driving performed by an autonomous driving vehicle.

Background Art

JP2020-052468A discloses a driving evaluation apparatus. The driving evaluation apparatus makes at least one of a device mounted on a vehicle and a mobile terminal of a passenger to display a question for evaluating driving of the vehicle controlled by autonomous driving, and receives an answer from the passenger to the question.

SUMMARY

As described above, an evaluation apparatus which evaluates autonomous driving performed by an autonomous driving vehicle is known. The evaluation apparatus carries out a questionnaire composed of one or more questions to a passenger of the autonomous driving vehicle and performs evaluation by acquiring one or more answers to the one or more questions. If the number of the questions composing the questionnaire is large, there is a possibility that a burden on the passenger increases. On the other hand, if the number of the questions is small, there is a possibility that many of the questions composing the questionnaire become general questions, and questions desired by the user of the evaluation apparatus are not included in the questionnaire.

An object of the present disclosure is to provide a technique, relating to the evaluation apparatus which evaluates autonomous driving performed by the autonomous driving vehicle, which enables carrying out a questionnaire composed of one or more appropriate questions while reducing the number of questions.

The first aspect relates to a questionnaire apparatus.

The questionnaire apparatus includes:

A question management unit configured to manage one or more questions prepared for a passenger of an autonomous driving vehicle to evaluate autonomous driving performed by the autonomous driving vehicle;

An information acquisition unit configured to acquire driving environment information and driving state information related to the autonomous driving; and A question determination unit configured to determine one or more request questions for requesting an answer from the passenger from among one or more managed questions based on at least one of the driving environment information and the driving state information.

The second aspect relates to a questionnaire method.

The questionnaire method includes:

Managing one or more questions prepared for a passenger of an autonomous driving vehicle to evaluate autonomous driving performed by the autonomous driving vehicle;

Acquiring driving environment information and driving state information related to the autonomous driving; and Determining one or more request questions for requesting an answer from the passenger from among one or more managed questions based on at least one of the driving environment information and the driving state information.

The third aspect relates to a program to be executed by a computer.

The program may be stored in a non-transitory computer-readable storage medium.

The program causes a computer to execute the questionnaire method according to the second aspect.

According to the present disclosure, the contents of the one or more questions is changed in accordance with the driving environment or the driving state of the vehicle. Specifically, based on the driving environment information and the driving state information of the vehicle, the one or more questions to which the passenger is requested to answer are determined from among all the questions. Therefore, it is possible to carry out a questionnaire composed of one or more appropriate questions while reducing the number of questions.

DETAILED DESCRIPTION

An embodiment of the present disclosure is described with reference to the accompanying drawings.

1. Overview

An evaluation apparatus according to the present embodiment evaluates autonomous driving performed by an autonomous driving vehicle. The evaluation apparatus carries out a questionnaire composed of one or more questions to a passenger of the autonomous driving vehicle and acquires an answer to a question. Then, the evaluation apparatus according to the present embodiment evaluates the autonomous driving based on one or more acquired answers and outputs the result of the evaluation. A user of the evaluation apparatus is assumed to be, for example, a developer of the autonomous driving vehicle. The developer can utilize the result of the evaluation by the evaluation apparatus, for example, in development to improve the function of the autonomous driving vehicle.

The questionnaire includes one or more questions related to a particular scene affected by driving environment or a driving state of the vehicle. Examples of a question related to a particular scene include a question such as "Was the speed smoothly adjusted in the intersection?" and a question such as "Did you notice any strange behavior when the vehicle passed an oncoming vehicle?" The questionnaire also includes one or more questions that are not affected by a scene. Examples of a question that is not affected by a scene include a question such as "How was the ride quality of the autonomous driving vehicle?". With respect to a question related to a particular scene such as a scene of driving in an intersection or a scene of passing an oncoming vehicle, there is a possibility that a precise answer cannot be acquired when the passenger does not meet with a scene relating to the question.

When the one or more questions composing the questionnaire are made to be questions comprehensively including contents desired by the user of the evaluation apparatus, there is a possibility that the number of the questions increases, or many questions related to a scene with which the passenger does not meet are included. When the user of the evaluation apparatus is the developer of the autonomous vehicle, for example, the developer needs to obtain as much information as possible so as to feed back it into the development. If all the questions desired by the user of the evaluation apparatus are included in the questionnaire to obtain a large amount of information, the number of the questions increases and a burden on the passenger increases. When the burden on the passenger increases, there is a possibility that the response rate of the questionnaire decreases, or it becomes difficult to obtain an appropriate answer.

In addition, for example, when a time zone of the driving, a driving place, a movement of a vehicle or a pedestrian around the autonomous driving vehicle, or the like changes, an item desired to be evaluated by the user of the evaluation apparatus also changes because a control state or a behavior of the autonomous driving vehicle changes. However, if all the questions corresponding to the respective control states and behaviors are included in the questionnaire, there is a possibility that the number of questions related to a scene with which the passenger does not meet increases, and an accurate answer cannot be obtained. If an accurate answer cannot be obtained, there is a possibility that the result of the evaluation become biased data, which cannot be utilized.

On the other hand, if the one or more questions composing the questionnaire are made to be only the questions that are not affected by a scene, it is possible to reduce the questions related to a scene with which the passenger does not meet. However, the questionnaire becomes general, and there is a possibility that the user of the evaluation apparatus cannot obtain an answer about the desired content.

Therefore, the evaluation apparatus according to the present embodiment changes one or more questions to request an answer from the passenger in accordance with the driving environment or the driving state of the vehicle. Specifically, the evaluation apparatus determines one or more questions for requesting an answer from the passenger among one or more questions managed by the evaluation apparatus based on the information about the driving environment or the information about the driving state. This enables to carry out a questionnaire composed of one or more appropriate questions while reducing the number of the questions.

A question for requesting an answer from the passenger is hereinafter referred to as a "request question". The information about the driving environment is hereinafter referred to as "driving environment information". The information about the driving state is hereinafter referred to as "driving state information". The driving environment information includes information about a particular situation on a driving route, weather, and details of the service. The driving state information includes information about a control state, a driving place, and a driving course of the vehicle.

Examples of a particular situation on the driving route include road blocking due to construction, passage of an ambulance, and the like. As an example of determining a question based on a particular situation on the driving route, a question such as "Did the vehicle take a detour avoiding the road blocking smoothly?" may be determined in a case where there is a road blocking due to construction.

As an example of determining a question based on the information about the weather, a question such as "Has there been any scenes that you felt uneasy because of slipping of the tire?" may be determined when the vehicle drives in rainy weather. As another example, a question corresponding to weather may be determined when the weather is fine, foggy, or snowfall.

The information about details of the service includes information about a service mode such as on-demand operation or regular operation and information about the entire service such as whether voice guidance is provided or not. As an example of determining a question based on the information about details of the service, a question such as "Wasn't the voice guidance troublesome?" or "Was the frequency of voice guidance appropriate?" may be determined in a case where the voice guidance is provided during the driving of the vehicle.

As an example of determining a question based on the information about the control state of the vehicle, a question such as "Was overtaking smooth?" may be determined in a case where the overtaking occurs during the driving. As another example, a question may be determined in accordance with a particular control state of the vehicle such as rapid acceleration/deceleration, rapid steering, or evacuation driving.

When a question is determined based on the information about the driving place, for example, in a case where the driving place includes a particular point, a question related to a phenomenon that is likely to occur at the point may be determined. Examples of a particular point include a point under a bridge, a bus stop, a tunnel, a slope, and an intersection. For example, it is assumed that in a case the vehicle passes under a bridge, a question such as "Didn't you feel oppressed when passing under the bridge?" is determined.

The information about the driving course includes information about on which course the autonomous driving vehicle drives. As an example of determining a question based on the information about a driving course, in a case where the vehicle drives in a predetermined course, a question related to a situation that is likely to occur in the course may be determined.

2. Embodiment 2-1. Configuration Example of Evaluation Apparatus

Figure 1:
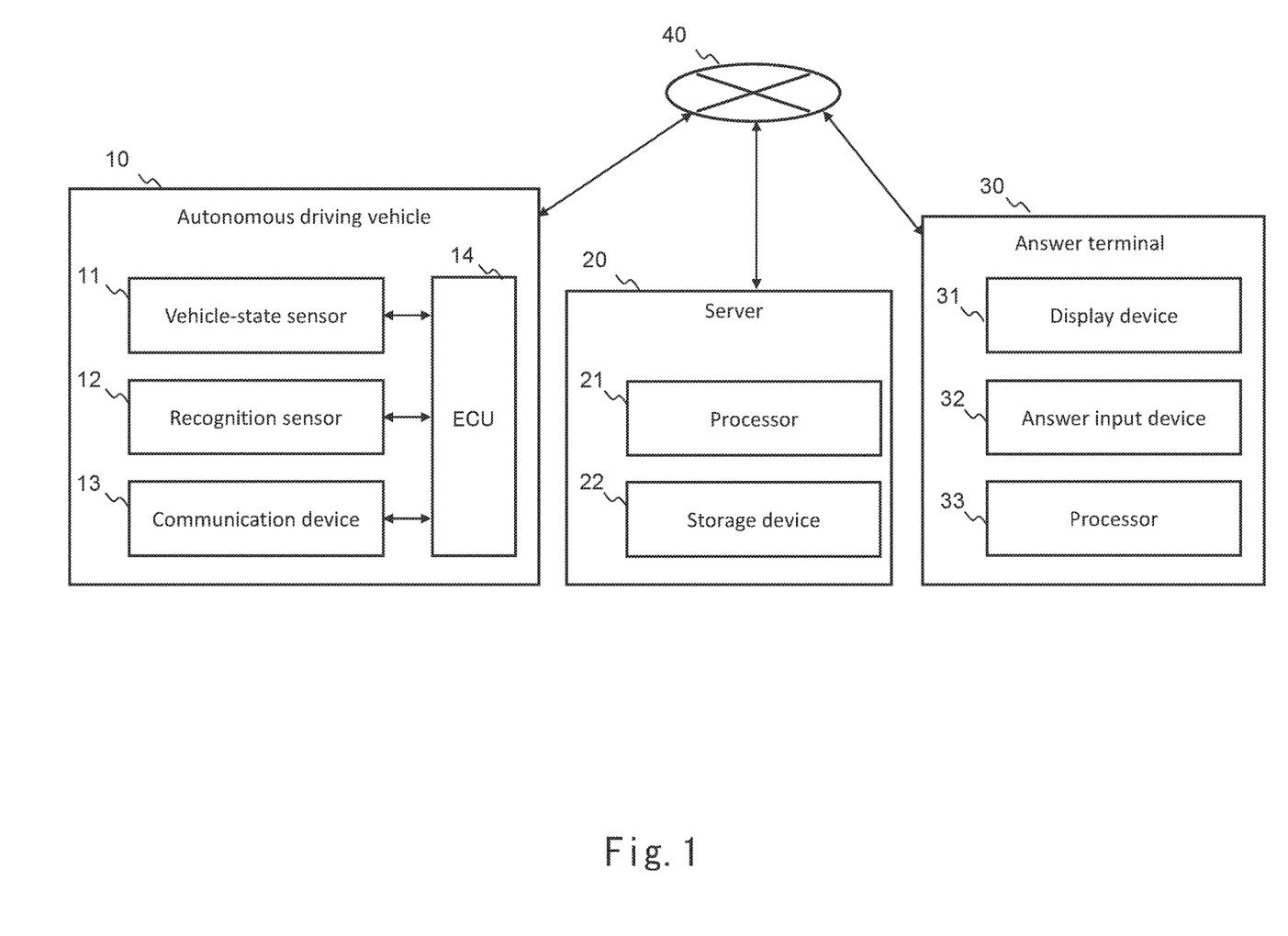
FIG. 1 is a block diagram illustrating an example of a configuration of an evaluation apparatus according to an embodiment of the present disclosure.

FIG. 1 is a block diagram illustrating an example of the configuration of the evaluation apparatus according to the present embodiment. FIG. 1 shows an autonomous driving vehicle 10, a server 20, and an answer terminal 30. The autonomous driving vehicle 10 is an autonomous driving vehicle that is a target of the evaluation of a questionnaire carried out by the evaluation apparatus according to the present embodiment. In the example of FIG. 1, the evaluation apparatus according to the present embodiment is configured as the server 20. However, the evaluation apparatus according to the present embodiment may be an apparatus mounted on the autonomous driving vehicle 10. The autonomous driving vehicle 10, the server 20, and the answer terminal 30 include a communication interface and are configured to be able to communicate with each other via a communication network 40. The communication network 40 may be a wireless communication network, a wired communication network, or a combination thereof.

The autonomous driving vehicle 10 includes a vehicle-state sensor 11, a recognition sensor 12, a communication device 13, and an electronic control unit (ECU) 14. The vehicle-state sensor 11, the recognition sensor 12, and the communication device 13 are configured to be able to communicate with the ECU 14 via a vehicular network. Examples of the vehicle-state sensor 11 include a vehicle speed sensor, a steering angle sensor, a yaw rate sensor, and a lateral acceleration sensor. Examples of the recognition sensor 12 include a camera, a microphone, a temperature-humidity sensor, and a moisture measurement sensor. The communication device 13 communicates with the outside of the vehicle. The communication device 13 may acquire position information of the vehicle using a GPS system, or may acquire operation information, map information, weather information, driving route information, and the like from a management server that manages information related to the vehicle.

The ECU 14 calculates information included in the driving state information and the driving environment information. For example, the vehicle-state sensor 11 transmits the vehicle-speed information related to the autonomous driving vehicles 10 to the ECU 14, and the ECU 14 calculates, based on the transmitted information, whether rapid acceleration/deceleration of the autonomous driving vehicle 10 occurs or not, thereby obtaining the information about the vehicle-control state. In addition, for example, the recognition sensor 12 transmits the temperature and humidity data to the ECU 14, and the ECU 14 calculates the weather at the time of driving of the autonomous driving vehicle 10 based on the transmitted data.

The autonomous driving vehicle 10 transmits the driving state information and the driving environment information to the server 20 via the communication network 40. The server 20 acquires the driving state information and the driving environment information by a communication device (information acquisition unit), which is not illustrated in FIG. 1.

The server 20 includes one or more processors 21 (hereinafter simply referred to as the processor 21) and one or more storage device (one or more memories) 22 (hereinafter simply referred to as the storage device 22). The storage device 22 stores various kinds of information such as one or more questions included in the questionnaire and one or more programs. The one or more programs may be stored in a non-transitory computer-readable storage medium. The processor 21 executes processing for evaluating the autonomous driving performed by the autonomous driving vehicle 10 by executing one or more programs stored in the storage device 22.

The answer terminal 30 includes a display device 31, an answer input device 32, and one or more processors 33 (hereinafter simply referred to as the processor 33). The display device 31 is a device to output one or more request questions to the passenger. The display device 31 may be a monitor to display the one or more request questions or may be a speaker to output the one or more request question by voice. In the example of FIG. 1, the display device 31 is configured as a monitor to display the one or more request questions. The answer input device 32 is a device for inputting an answer to a request question. The answer input device 32 may be, for example, a touch panel, a switch, a microphone to receive an input of an answer by voice, or the like. The processor 33 executes various kinds of processing for displaying the one or more request questions on the display device 31 and acquiring the one or more answers from the answer input device 32. The answer terminal 30 may be a device mounted on the vehicle or may be a portable terminal such as a mobile phone.

The processor 21 executes processing for determining one or more request questions. Then, the server 20 transmits the one or more determined request questions to the answer terminal 30 via the communication network 40, and the display device 31 outputs the one or more transmitted request questions. One or more answers to the one or more request questions are input into the answer input device 32, and the answer terminal 30 acquires the one or more input answers. The answer terminal 30 transmits the one or more acquired answers to the server 20 via the communication network 40.

2-2. Example of Functional Configuration of Evaluation Apparatus

Figure 2:
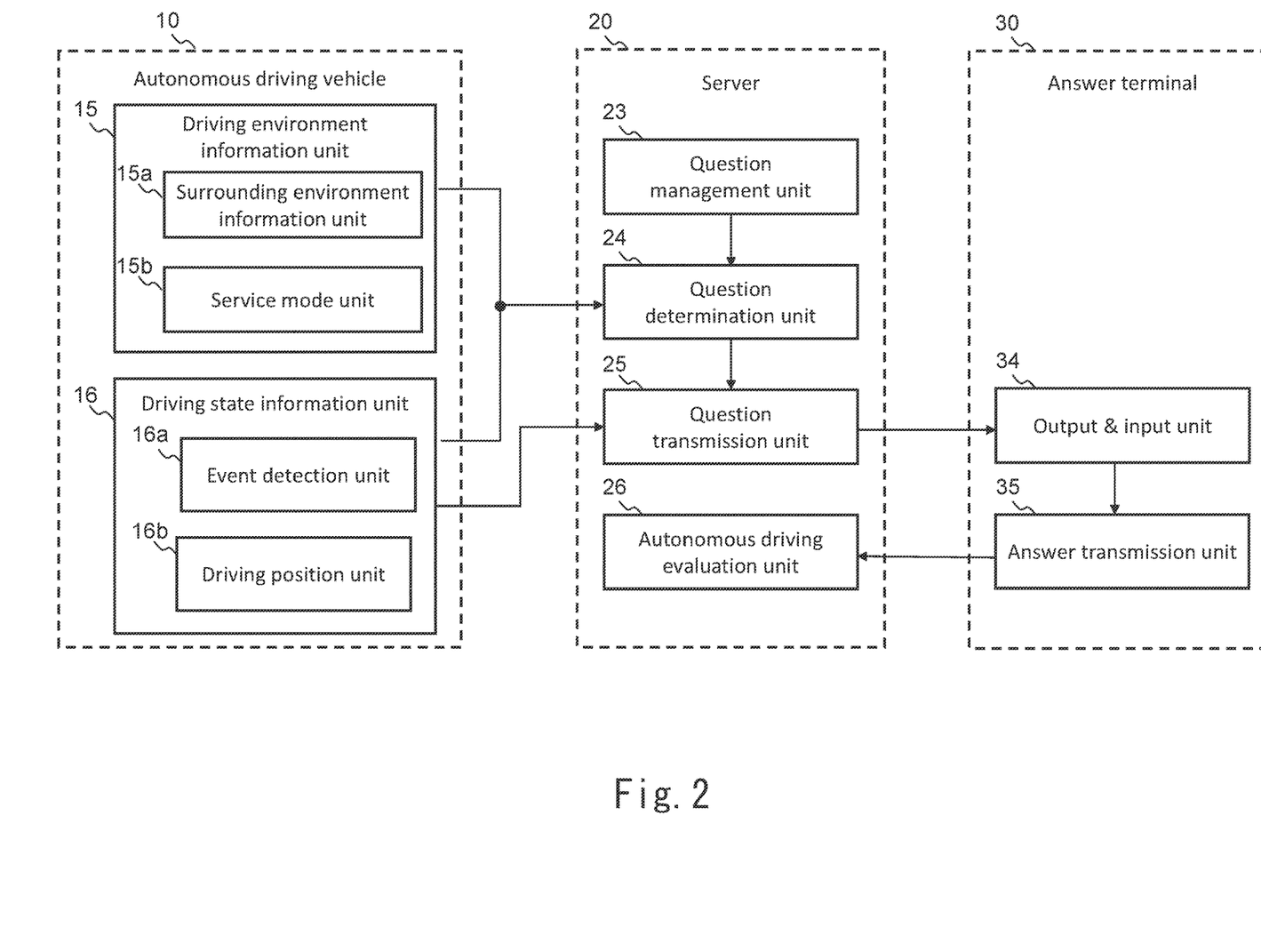
FIG. 2 is a block diagram illustrating an example of a functional configuration of an evaluation apparatus according to an embodiment of the present disclosure.

FIG. 2 is a block diagram illustrating an example of a functional configuration of the evaluation apparatus according to the present embodiment.

The autonomous driving vehicle 10 includes a driving environment information unit 15 and a driving state information unit 16. The driving environment information unit 15 includes a surrounding environment information unit 15a and a service mode unit 15b. The driving state information unit 16 includes an event detection unit 16a and a driving position unit 16b. The server 20 includes a question management unit 23, a question determination unit 24, a question transmission unit 25, and an autonomous driving evaluation unit 26. The answer terminal 30 includes an output & input unit 34 and an answer transmission unit 35.

The driving environment information unit 15 acquires the driving environment information related to the vehicle. The driving environment information includes information about weather or a particular situation acquired by the surrounding environment information unit 15a and information about a service mode acquired by the service mode unit 15b. The acquisition of the driving environment information is achieved by, for example, the communication device 13 acquiring information about a driving route, weather, and a service mode from the management server. Alternatively, it is achieved by, for example, the temperature-humidity sensor and the moisture measurement sensor, and the ECU 14 estimating weather based on the outputs of the sensors.

The driving state information unit 16 acquires the driving state information. The driving state information includes the information about a particular control state of the vehicle acquired by the event detection unit 16a and the information about a driving course or a driving position of the vehicle acquired by the driving position unit 16b. Further, the driving state information may include information about a driving position of the vehicle at the time when a control state of the vehicle becomes a particular state. The event detection unit 16*a* is achieved by, for example, the vehicle-state sensor 11 and an ECU calculating a vehicle control state based on an output of the vehicle-state sensor 11. The driving position unit 16*b* is achieved by, for example, a GPS-receiving device and an ECU calculating a driving course and a driving position based on an output of the GPS-receiving device.

The question management unit 23, the question determination unit 24, the question transmission unit 25, and the autonomous driving evaluation unit 26 are achieved by processing executed by the processor 21.

The question management unit 23 manages the one or more questions composing the questionnaire. The question management unit 23 performs question management such as, for example, storing a question input into the server 20 by the user as a question to be included in the questionnaire in the storage device 22, or extracting data of a stored question when a request question is determined. The question determination unit 24 determines the one or more request questions from among the one or more questions managed by the question management unit 23 based on the information acquired by the driving environment information unit 15 and the driving state information unit 16. The question transmission unit 25 transmits the one or more determined request questions to the output & input unit 34. They may be transmitted immediately before the vehicle arrives at the destination, after the vehicle arrives at the destination, or earlier than the arrival by a predetermined time. In a case where the question transmission unit 25 transmits the one or more request questions at a predetermined timing, the question transmission unit 25 calculates the time at which the vehicle arrives at the destination from the information acquired by the driving position unit 16*b*.

The autonomous driving evaluation unit 26 receives one or more answers from the answer transmission unit 35. The autonomous driving evaluation unit 26 evaluates the autonomous driving performed by the autonomous driving vehicle based on the one or more received answers. For example, the autonomous driving evaluation unit 26 adds up the received answers and obtains the result of the evaluation of the autonomous driving. The autonomous driving evaluation unit 26 may further transmit the result of the evaluation to the user of the evaluation apparatus. The server 20 may be configured not to include the autonomous driving evaluation unit 26. In a case where the server 20 does not include the autonomous driving evaluation unit 26, it is assumed that, for example, an external server, which is not illustrated in FIG. 2, acquires the one or more answers from the answer transmission unit 35 and evaluates the autonomous driving based on the one or more acquired answers.

The evaluation apparatus according to the present embodiment may not include the autonomous driving evaluation unit 26. In this case, the evaluation apparatus outputs the one or more answers to the one or more request questions acquired from the answer transmission unit 35 as the result of the questionnaire. Therefore, in this case, the evaluation apparatus can be referred to as a "questionnaire apparatus".

The output & input unit 34 outputs the one or more request questions to the passenger and acquires one or more answers to the one or more request questions. Outputting of the one or more request questions and the acquisition of the one or more answers may be performed by visual means such as a monitor and a touch panel or may be performed using voice and sound. The output & input unit 34 is achieved by, for example, the display device 31, the answer input device 32, and the processor 33. The answer transmission unit 35 transmits the one or more acquired answers to the autonomous driving evaluation unit 26. The answer transmission unit 35 is achieved by, for example, the processor 33 controlling transmission of the one or more answers acquired by the answer input device 32 via the communication network 40.

The timing at which the output & input unit 34 outputs the one or more request questions and the timing at which the output & input unit 34 acquires the one or more answers may be before or after the vehicle arrives at the destination. For example, the one or more request questions may be output a predetermined time before arriving at the destination, and the one or more answers may be acquired immediately before arriving. In this case, the passenger answers the questionnaire while riding the vehicle, so that he/she can make better use of him/her time during the autonomous driving. Alternatively, for example, in a case where the answer terminal 30 is a mobile phone of the passenger, the one or more request questions may be output after the vehicle arrives at the destination, and the one or more answers may be acquired later. In this case, the passenger can answer the questionnaire without time limit.

2-3. First Modification of Embodiment

As the first modification example of the embodiment, it is assumed that a fixed question, which is always determined as a request question, is included in the one or more questions. In the first modification example, one or more fixed questions are included in the one or more questions managed by the question management unit 23. The question determination unit 24 determines every fixed question as a request question. Other configurations and functional configurations are achieved by the same configurations as the configurations described in 2-1 and the same functional configurations as the functional configurations described in 2-2. A fixed question is assumed to be a question that is not affected by a scene. Examples of a question that is not affected by a scene include a question about an attribute of the passenger such as sex and age, and a question about impression of the whole driving.

2-4. Second Modification of Embodiment

As the second modification example of the embodiment, it is assumed that a predetermined upper limit is set on the number of the request questions. In the second modification example, the question determination unit 24 prioritizes the one or more questions managed by the question management unit 23. When the number of the request questions exceeds a predetermined upper limit, the question determination unit 24 determines one or more request questions in descending order of priority so that the number of the request questions is equal to or less than the upper limit. Other configurations and functional configurations are achieved by the same configurations as the configurations described in 2-1 and the same functional configurations as the functional configurations described in 2-2. In the second modification example, the burden on the passenger can be further reduced.

2-5. Third Modification of Embodiment

As the third modification example of the embodiment, it is assumed that one or more fixed questions are included in the one or more questions, and one or more mandatory questions, to which the passenger necessarily needs to answer, are included in the one or more fixed questions. In the third modification example, if the one or more answers to the one or more mandatory questions are not included in one or more answers received from the answer transmission unit 35, the autonomous driving evaluation unit 26 does not add up the one or more received answers. Other configurations and functional configurations are achieved by the same configurations as the configurations described in 2-1 and the same functional configurations as the functional configurations described in 2-2. By including one or more mandatory questions, it is possible to obtain a less biased result of the questionnaire. For example, it is assumed that a question such as "Where was a seat position in the vehicle" is made to be a mandatory question, and answers are added up for each seat position.

3. Examples of Processing Executed by Evaluation Apparatus

Hereinafter, examples of processing executed by the evaluation apparatus according to the present embodiment is described. The first example is an example in which a question is determined based on the information about the details of the service. The second example is an example in which a question is determined based on the information about the driving place. The third example is an example in which a question is determined based on the information about the control state of the vehicle.

3-1. First Example

Figure 3:
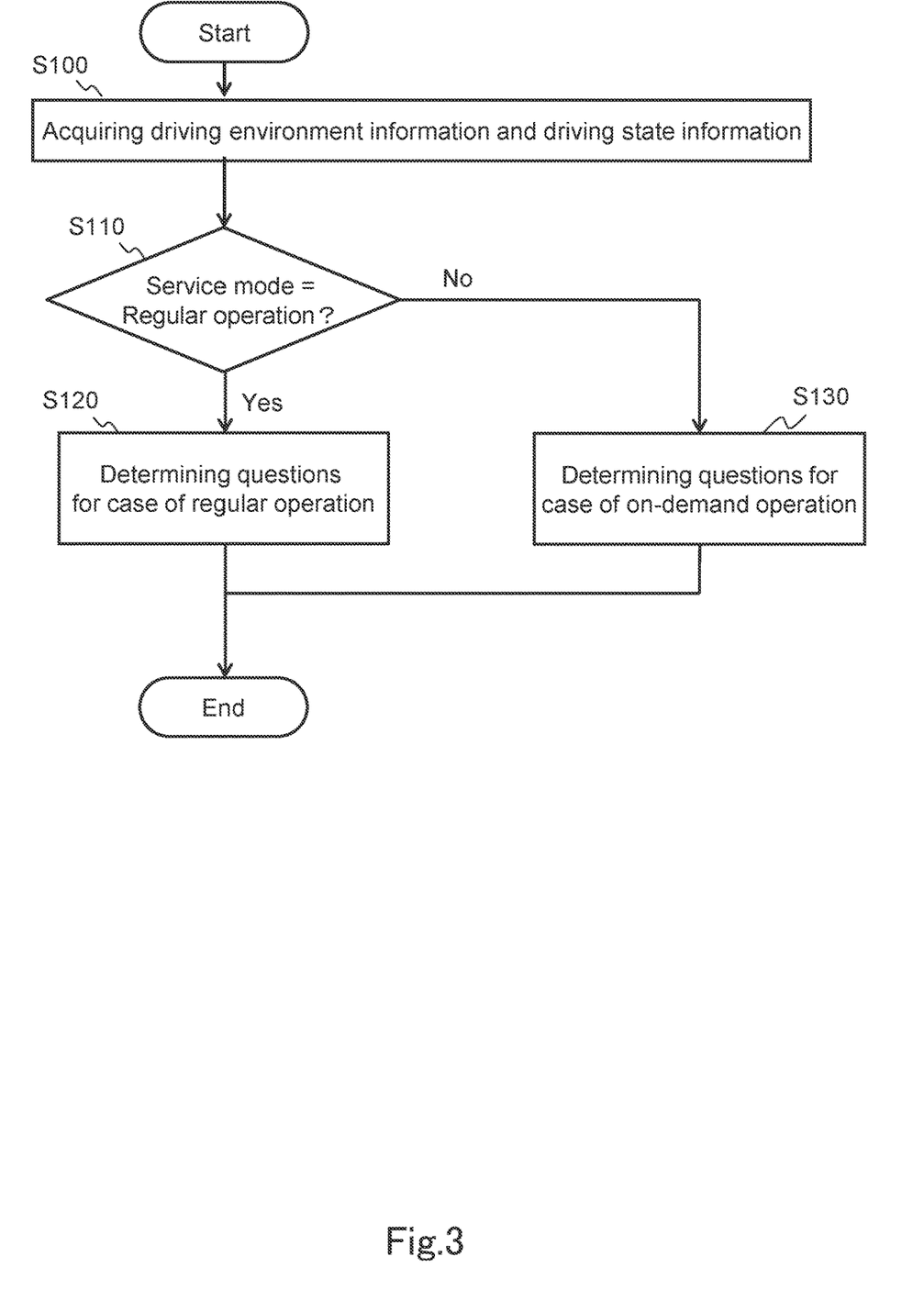
FIG. 3 is a flowchart illustrating the first example of a process executed by an evaluation apparatus according to an embodiment of the present disclosure.

FIG. 3 is a flowchart showing the first example of processing executed by the evaluation apparatus according to the present embodiment. In Step S100, the information acquiring unit acquires the driving environment information and the driving state information. When the driving environment information and the driving state information are acquired, the processing proceeds to Step S110.

In Step S110, it is determined whether the service mode is regular operation or not. It is determined whether the service mode is regular operation or not, for example, based on information acquired by the service mode unit 15b by the question determination unit 24. When the service mode is regular operation (Step S110; Yes), the processing proceeds to Step S120. When the service mode is on-demand operation, which is not regular operation, (Step S110; No), the processing proceeds to Step S130.

In Step S120, the question determination unit 24 determines one or more questions prepared for the case of regular operation as request questions. In Step S130, the question determination unit 24 determines one or more questions prepared for the case of on-demand operation as request questions. For example, it is assumed that a question such as "Didn't you wait too long at the bus stop?" is determined in Step S120. In addition, for example, it is assumed that a question such as "Was the selected driving route appropriate?" is determined in Step S130.

In the first example, the determination in Step S110 may be performed at the time when the service mode is determined. The question determination unit 24 may execute the processing according to the first example at the time when the service mode is determined or may execute the processing according to the first example at the time when the questionnaire is carried out.

3-2. Second Example

Figure 4:
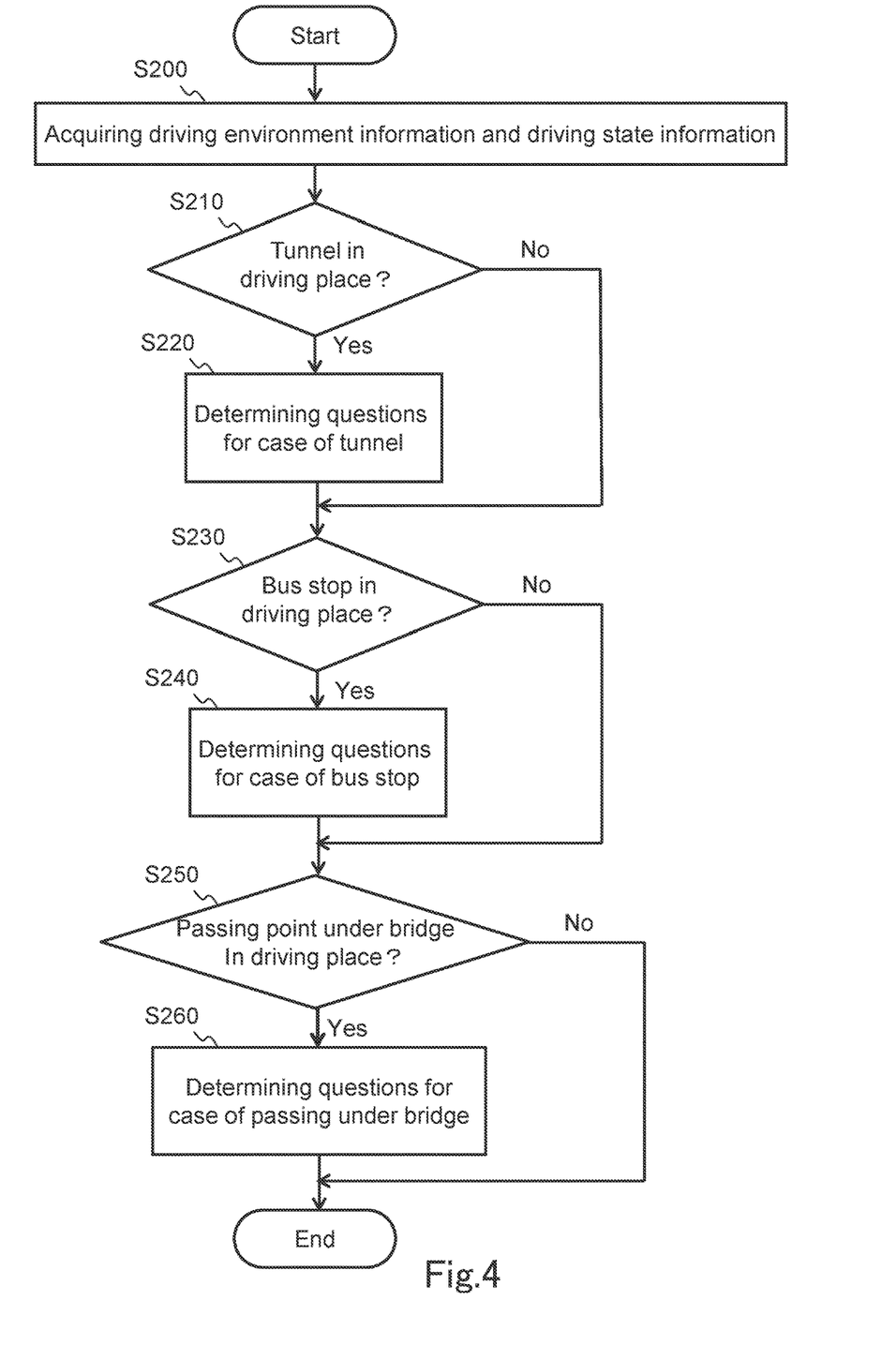
FIG. 4 is a flowchart illustrating the second example of a process executed by an evaluation apparatus according to an embodiment of the present disclosure.

FIG. 4 is a flowchart showing the second example of processing executed by the evaluation apparatus according to the present embodiment. In Step S200, the information acquiring unit acquires the driving environment information and the driving state information. When the driving environment information and the driving state information are acquired, the processing proceeds to Step S210.

In Step S210, it is determined whether there is a tunnel in the driving place of the vehicle or not. It may be determined whether there is a tunnel or not, for example, by the question determination unit 24 based on the driving environment information. Further, it may be determined, for example, by the question determination unit 24 based on GPS information and map information. When there is a tunnel in the driving place of the vehicle (Step S210; Yes), the processing proceeds to Step S220. When there are no tunnels (Step S210; No), the processing proceeds to Step S230.

In Step S220, the question determination unit 24 determines one or more questions prepared for a case where there is a tunnel as request questions. Then, the processing proceeds to Step S230.

In Step S230, it is determined whether there is a bus stop in the driving place of the vehicle or not. When there is a bus stop (Step S230; Yes), the processing proceeds to Step S240. When there are no bus stops (Step S230; No), the processing proceeds to Step S250.

In Step S240, the question determination unit 24 determines one or more questions prepared for a case where there is a bus stop as request questions. Then, the processing proceeds to step S250.

In Step S250, it is determined whether there is a point at which the vehicle pass under a bridge or not. When there is a point passing under the bridge (Step S250; Yes), the processing proceeds to Step S260. When there is no points passing under the bridge (Step S250; No), the process ends.

In Step S260, the question determination unit 24 determines one or more questions prepared for a case where there is a point passing under a bridge as request questions.

In the second example, the determination in Steps S210, S230, and S250 may be performed at the time when the route on which the autonomous driving vehicle drives is determined. The question determination unit 24 may execute the process according to the second example at the time when the route on which the autonomous driving vehicle drives is determined, or may execute the process according to the second example at the time when the questionnaire is carried out.

3-3. Third Example

Figure 5:
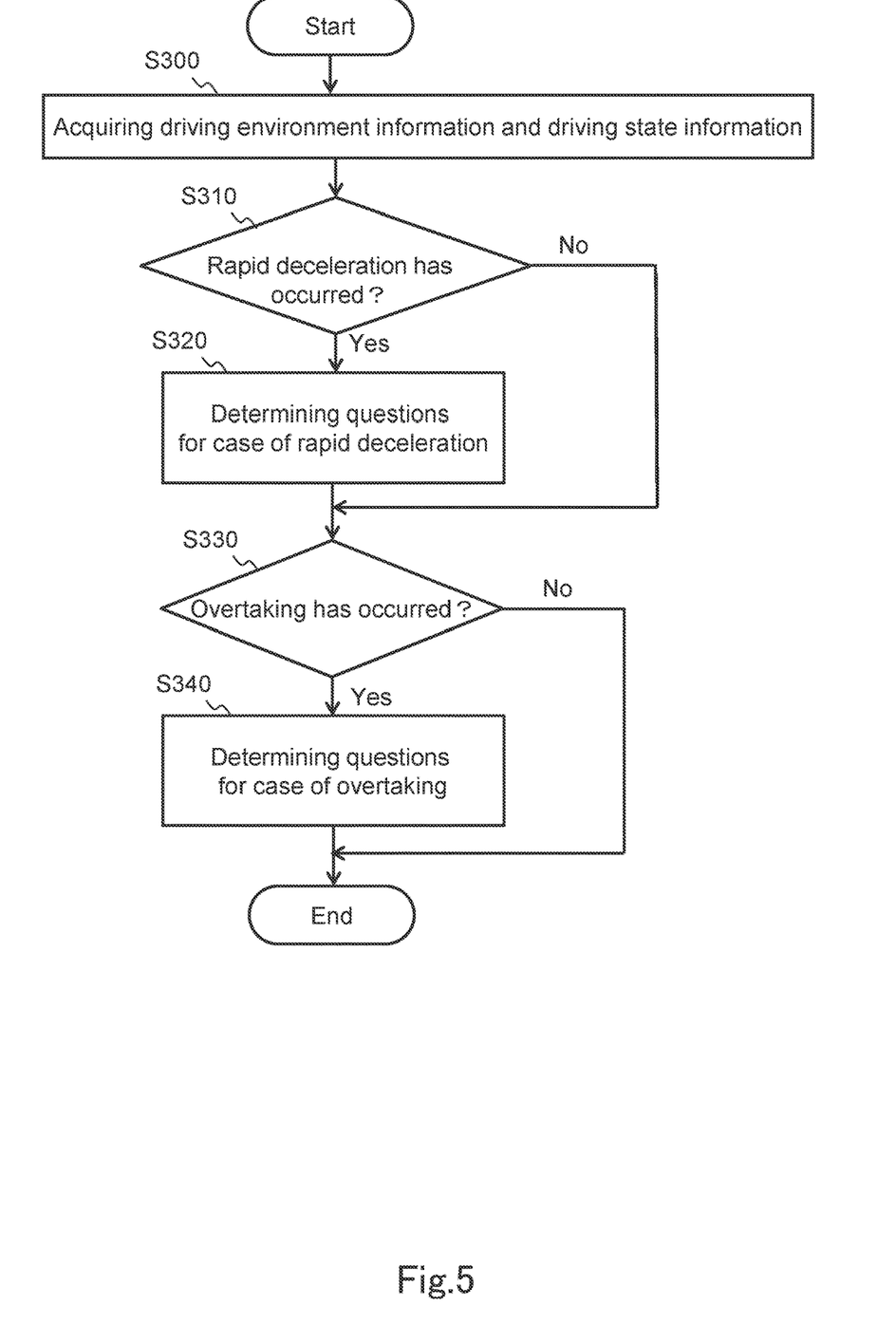
FIG. 5 is a flowchart illustrating the third example of a process executed by an evaluation apparatus according to an embodiment of the present disclosure.

FIG. 5 is a flowchart showing a third example of processing executed by the evaluation apparatus according to the present embodiment. In Step S300, the information acquiring unit acquires the driving environment information and the driving state information. When the driving environment information and the driving state information are acquired, the processing proceeds to Step S310.

In Step S310, it is determined whether rapid deceleration has occurred during the driving of the vehicle or not. It is determined whether rapid deceleration has occurred during the driving of the vehicle or not, for example, by the question determination unit 24 based on the information acquired by the event detection unit 16a. When rapid deceleration has occurred (Step S310; Yes), the processing proceeds to Step S320. When rapid deceleration has not occurred (Step S310: No), the processing proceeds to Step S330.

In Step S320, the question determination unit 24 determines one or more questions prepared for a case where rapid deceleration has occurred as request questions. Then, the processing proceeds to Step S330.

In Step S330, it is determined whether overtaking has occurred during the driving of the vehicle or not. When overtaking has occurred (Step S330; Yes), the processing proceeds to Step S340. When overtaking has not occurred (Step S330; No), the process ends.

In Step S340, the question determination unit 24 determines one or more questions prepared for a case where overtaking has occurred as request questions.

In the third example, the one or more request questions are determined based on the result of driving actually performed by the autonomous driving vehicle. In a case where the determination of the one or more request questions performed by the question determination unit 24 is performed at regular control intervals, the number of the request questions determined until the vehicle arrives at the destination may increase. The determination of the one or more request questions may be performed immediately before the vehicle arrives at the destination.

By the process described in the above examples, it is possible to change the one or more questions composing the questionnaire in accordance with a scene. In the first to third examples, the one or more questions are determined based on one type of information among the information about the particular situation in the driving route, the weather, the details of the service, the control state of the vehicle, the driving place, and the driving course. However, the one or more questions may be determined based on two or more types of information among of the information thereof.

4. Effects

As described above, the evaluation apparatus according to the present embodiment changes one or more questions of the questionnaire in real time. According to the embodiment of the present disclosure, it is possible to provide a technique that enables carrying out a questionnaire composed of one or more appropriate questions while reducing the number of the questions. As a result, the burden on the passenger can be reduced, and the response rate can be improved, or the possibility of obtaining an accurate answer can be stronger, so that the satisfaction is improved for both the passenger and the user of the evaluation apparatus.

What is claimed is:

1. A questionnaire apparatus comprising:
   an autonomous driving vehicle that includes one or more sensors;
   a server that includes:
   one or more processors; and
   one or more memories storing one or more programs that, when executed by the one or more processors, cause the one or more processors to execute:
   managing one or more questions prepared for a passenger of the autonomous driving vehicle to evaluate autonomous driving performed by the autonomous driving vehicle;
   acquiring, via the one or more sensors, driving environment information and driving state information related to the autonomous driving, including an occurrence of rapid acceleration or deceleration of the autonomous driving vehicle to determine a vehicle control state, a driving route undertaken by the autonomous driving vehicle, and a driving position of the autonomous driving vehicle when the vehicle control state becomes a particular state that includes rapid steering or evacuation driving or the rapid acceleration or deceleration;
   determining one or more request questions for requesting an answer from the passenger from among one or more managed questions based on the driving environment information and the driving state information and in accordance with the vehicle control state, wherein the one or more request questions includes at least one question related to a specific scene encountered during the autonomous traveling by the autonomous driving vehicle, and at least one question unaffected by the specific scene encountered during the autonomous traveling by the autonomous driving vehicle; and
   transmitting the one or more request questions at a predetermined timing in response to determining a time at which the autonomous driving vehicle is caused to autonomously arrive at a destination from the acquired driving state information; and
   an answer terminal that includes one or more processors and a display device, wherein the one or more processors of the answer terminal are configured to receive the one or more request questions from the one or more processors of the server, and control an output of the one or more request questions via the display device.

2. The questionnaire apparatus according to claim 1, wherein the determining the one or more request questions includes prioritizing the one or more questions, and when a number of the one or more request questions exceeds a predetermined number, determining the one or more request questions in descending order of priority so that the number of the one or more request questions is equal to or less than the predetermined number.

3. The questionnaire apparatus according to claim 1, wherein the one or more programs, when executed by the one or more processors, cause the one or more processors to execute:
   acquiring an answer to the one or more request questions; and
   evaluating the autonomous driving based on the answer.

4. The questionnaire apparatus according to claim 1, wherein the one or more programs, when executed by the one or more processors, cause the one or more processors to execute:
   acquiring an answer to the one or more request questions; and
   evaluating the autonomous driving based on the answer.

5. The questionnaire apparatus according to claim 4, wherein the at least one question unaffected by the specific scene encountered during the autonomous traveling by the autonomous driving vehicle includes one or more mandatory questions, and the evaluating the autonomous driving is performed only when an answer to the one or more mandatory questions is acquired.

6. A questionnaire method performed by a questionnaire apparatus, the method comprising:
   managing, by one or more processors of a server of the questionnaire apparatus, one or more questions prepared for a passenger of an autonomous driving vehicle to evaluate autonomous driving performed by the autonomous driving vehicle;
   acquiring, by one or more sensors of the autonomous driving vehicle of the questionnaire apparatus, driving environment information and driving state information related to the autonomous driving, including an occurrence of rapid acceleration or deceleration of the autonomous driving vehicle to determine a vehicle control state, a driving route undertaken by the autonomous driving vehicle, and a driving position of the autonomous driving vehicle when the vehicle control state becomes a particular state that includes rapid steering or evacuation driving or the rapid acceleration or deceleration;

determining, by the one or more processors of the server, one or more request questions for requesting an answer from the passenger from among one or more managed questions based on the driving environment information and the driving state information and in accordance with the vehicle control state, wherein the one or more request questions includes at least one question related to a specific scene encountered during the autonomous traveling by the autonomous driving vehicle, and at least one question unaffected by the specific scene encountered during the autonomous traveling by the autonomous driving vehicle;

transmitting, by the one or more processors of the server, the one or more request questions at a predetermined timing in response to determining a time at which the autonomous driving vehicle is caused to autonomously arrive at a destination from the acquired driving state information; and receiving, by one or more processors of an answer terminal of the questionnaire apparatus, the one or more request questions from the one or more processors of the server, and controlling an output of the one or more request questions via a display device of the answer terminal.

7. A non-transitory computer-readable storage medium storing a program configured to cause a computer to execute:

managing one or more questions prepared for a passenger of an autonomous driving vehicle to evaluate autonomous driving performed by the autonomous driving vehicle;

acquiring, by one or more sensors of the autonomous driving vehicle, driving environment information and driving state information related to the autonomous driving, including an occurrence of rapid acceleration or deceleration of the autonomous driving vehicle to determine a vehicle control state, a driving route undertaken by the autonomous driving vehicle, and a driving position of the autonomous driving vehicle when the vehicle control state becomes a particular state that includes rapid steering or evacuation driving or the rapid acceleration or deceleration;

determining one or more request questions for requesting an answer from the passenger from among one or more managed questions based on the driving environment information and the driving state information and in accordance with the vehicle control state, wherein the one or more request questions includes at least one question related to a specific scene encountered during the autonomous traveling by the autonomous driving vehicle, and at least one question unaffected by the specific scene encountered during the autonomous traveling by the autonomous driving vehicle;

transmitting the one or more request questions at a predetermined timing in response to determining a time at which the autonomous driving vehicle is caused to autonomously arrive at a destination from the acquired driving state information; and receiving, by one or more processors of an answer terminal, the one or more request questions, and controlling an output of the one or more request questions via a display device of the answer terminal.

* * * * *